INVENTOR.
EDWIN A. HEDIGER
BY Richard W. Treventon
ATTORNEY

United States Patent Office 3,267,811
Patented August 23, 1966

3,267,811
GEAR CHAMFERING MACHINE
Edwin A. Hediger, Fairport, N.Y., assignor to The Gleason Works, Rochester, N.Y., a corporation of New York
Filed Nov. 27, 1964, Ser. No. 414,078
14 Claims. (Cl. 90—1.4)

The present invention relates to a machine for chamfering gear teeth, especially the acute edges at the ends of the teeth of spiral bevel and hypoid pinions.

An object of the invention is a simple, compact and inexpensive machine which will accommodate pinions of various sizes and designs with change of few parts.

A further object is a machine having these attributes and whose tools are multi-edged milling cutters, to provide for rapid chamfering action and long life between tool sharpening and replacement.

A machine according to the invention comprises a frame, a work spindle journaled for rotation in the frame, indexing mechanism for angularly advancing the work spindle about its rotation axis, a cutter support pivoted to the frame for oscillation about an axis transverse of the work spindle, a milling cutter rotatable on the support about an axis parallel to said axis of oscillation, means for rotating the cutter, and coordinated drive means for actuating the indexing mechanism and for oscillating the cutter support to thereby infeed and withdraw the cutter relative to a workpiece on the spindle, said drive means being coordinated to cause indexing of the spindle while the cutter is withdrawn.

The foregoing and other objects and advantages of the invention will appear from the following description of the preferred embodiment shown in the accompanying drawings, wherein.

Figure 2:
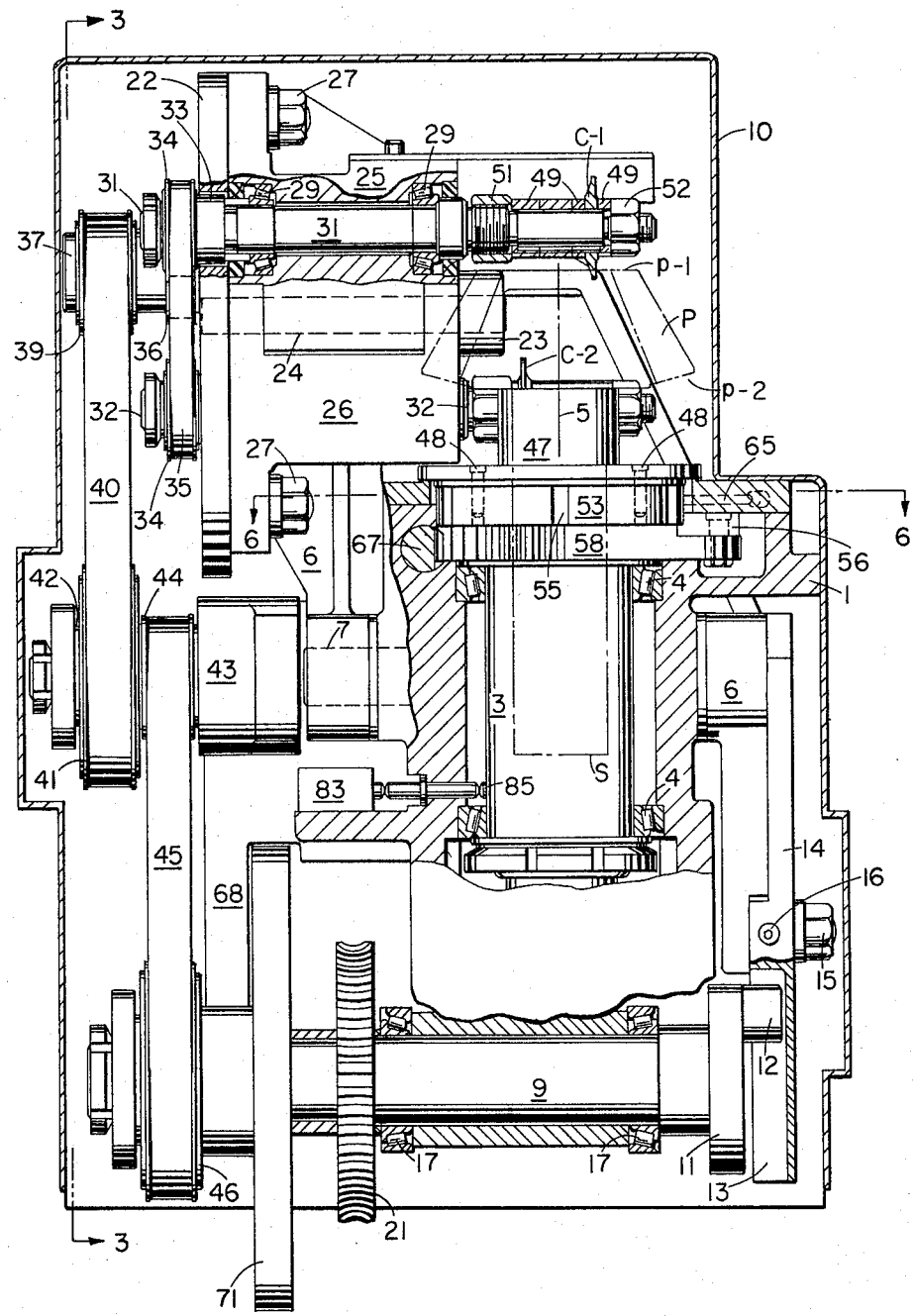
Figure 3:
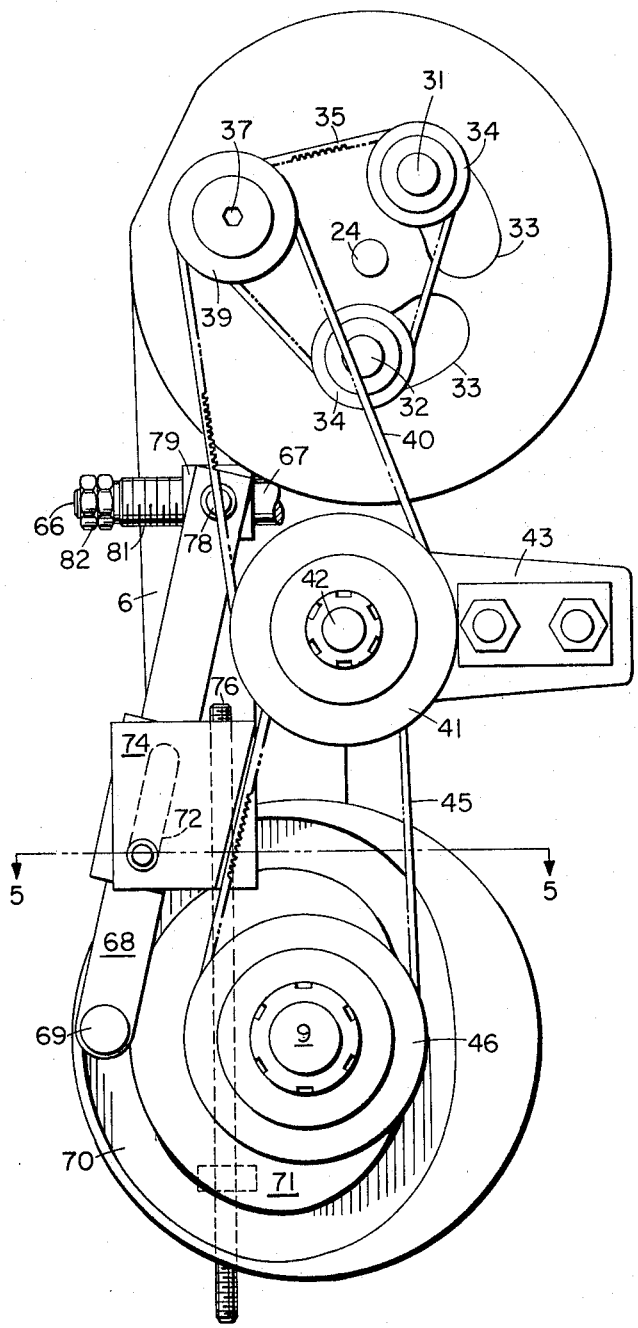
FIG. 3 is a fragmentary elevation, in approximately plane 3—3 of FIG. 2, showing drive elements of the machine on the side thereof opposite FIG. 1.
Figure 4:
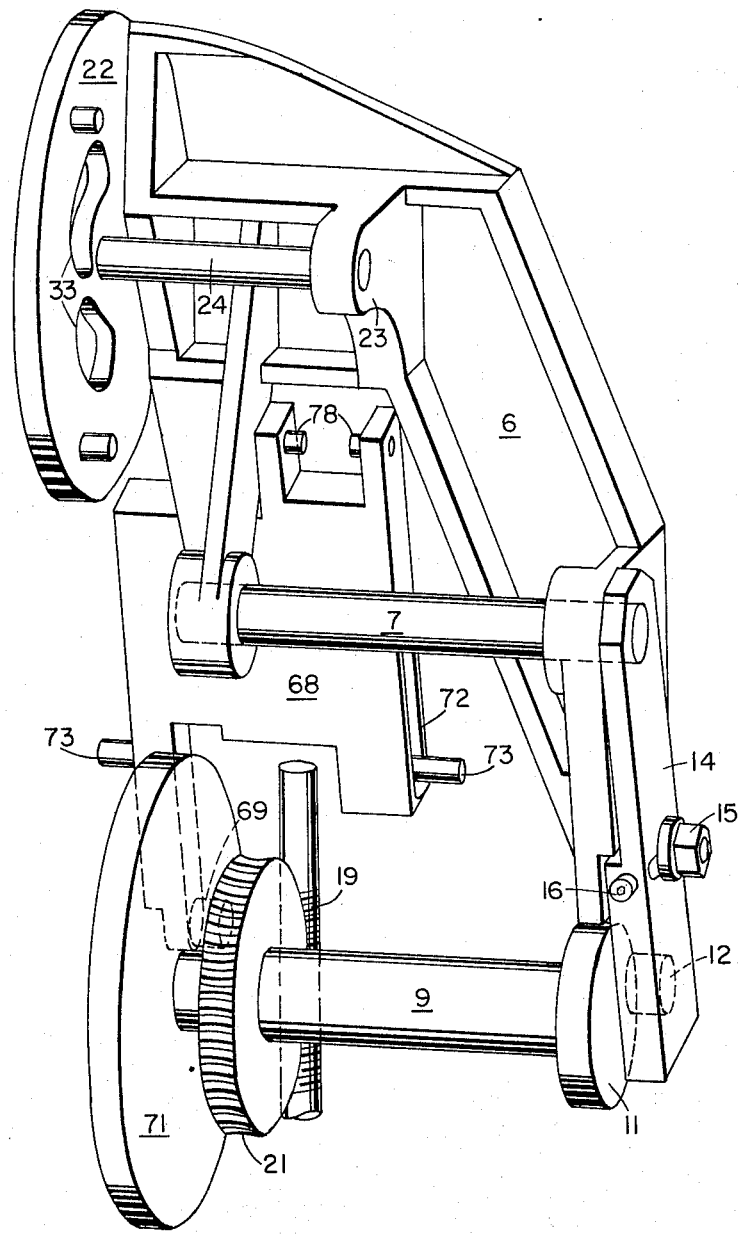
Figure 5:
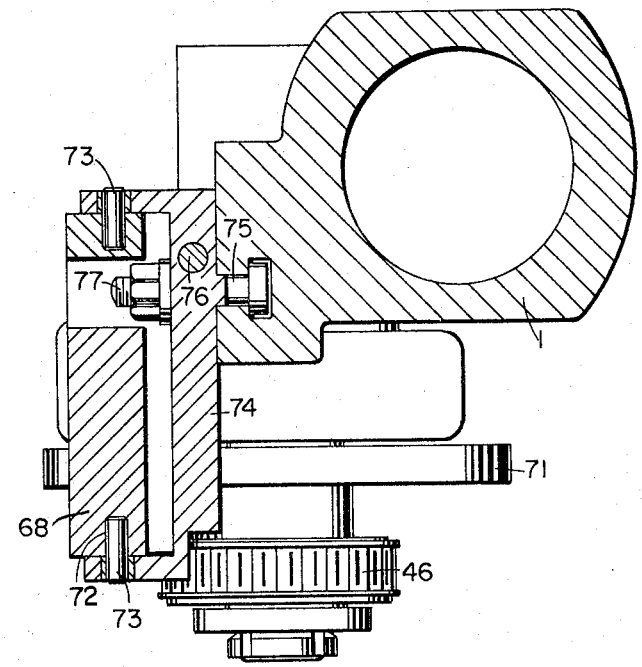
Figure 6:
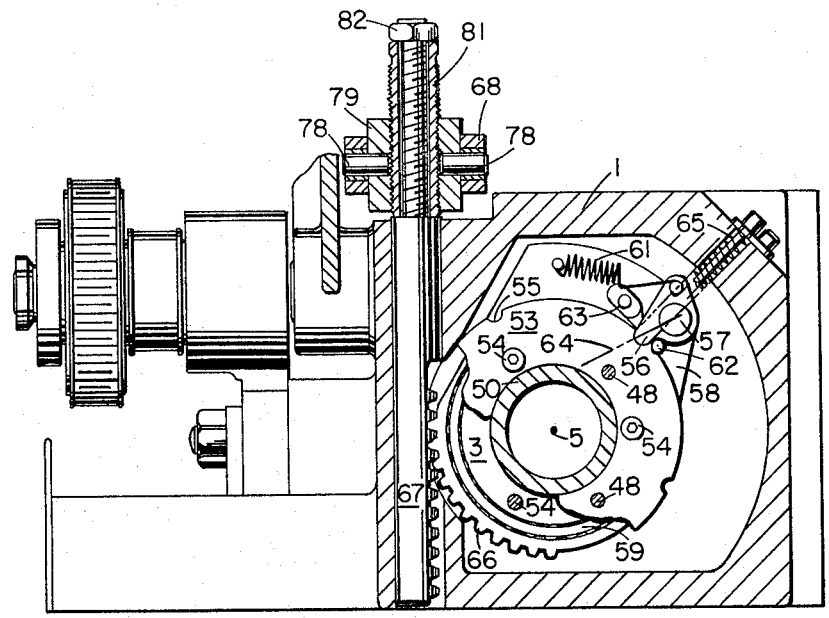

FIG. 4 is an isometric view of the cutter support and adjacent parts of the machine; and, FIGS. 5 and 6 are horizontal sectional views respectively in planes 5—5 of FIG. 3 and 6—6 of FIG. 2.

The machine comprises a frame 1 adapted to be mounted on a suitable pedestal 2 which if desired may be attached to or made a part of a gear tooth cutting machine. Around the frame and surrounding most of the working parts of the machine is a sheet metal cover 10. A tubular work spindle 3 is journaled in the frame on anti-friction bearings 4 for rotation about vertical axis 5. The spindle contains an hydraulically actuated chucking mechanism for releasably securing in the spindle the shank S of a pinion P whose toe and heel tooth edges p–1 and p–2 are to be chamfered. This chucking mechanism is similar to that disclosed in Carlsen et al. Patent 2,898,813, but may be of any suitable type.

The chamfering tools are milling cutters C–1 and C–2, whose side cutting profiles are shaped to correspond generally to the edges p–1, p–2. These cutters are carried by a cutter support 6 which is pivoted to the frame 1 by a pin 7 to enable the cutters to be swung through a sufficient arc to bring them into cutting engagement with the work and to move them so far clear of such engagement that the work may be loaded into the spindle 3 and removed therefrom. Such loading and unloading may be effected either manually or by a suitable automatic work handling mechanism, not shown. The swinging motion is effected by a crank comprising shaft 9, check 11 and pin 12, the latter engaging in slot 13 in an arm 14 which is secured to cutter support 6 by screw and nut 15. Arm 14 is pivoted on pivot pin 7 and when nut 15 is loosened may be adjusted relative to support 6 about the pin by means of adjusting screws 16. In this way the arc through which the cutters are swung by rotating crank 11, 12, may be adjusted to suit pinions P of different diameters.

Shaft 9 is supported on the frame 1 in bearings 17 and is driven by a motor 18 that also is mounted on the frame and has keyed to its armature shaft a worm 19, FIG. 4, meshing with a worm wheel 21 on the shaft. The cutters C–1 and C–2, and also the mechanism for intermittently indexing the work spindle, are driven from this same shaft.

As best shown in FIG. 4, the upper portion of support 6 has flanges 22 and 23 which support a rod 24 in parallel relation to pin 7 and shaft 9, and perpendicularly to the inner face of flange 22. Cutter spindle housings 25 and 26 are mounted on this rod between flanges 22 and 23, and are angularly adjustable about it. They seat upon the inner face of flange 22, and, after adjustment about rod 24, are secured by nuts 27 screw-threaded to studs which are anchored in the flange 22 and extend through arcuate slots 28 in the mounting flanges of the spindle housings. Journaled respectively in these housings on anti-friction bearings 29 are spindles 31 and 32 upon which the respective cutters C–1 and C–2 are keyed. The spindles extend through arcuate slots 33 in flange 22 and have cog pulleys 34 secured to their ends remote from the cutters. An endless drive cog belt 35 extends around these pulleys and also around a similar pulley, 36, that is rotatable on anti-friction bearings on a stub shaft 37 secured to flange 22. A pulley 39 corotatable with pulley 36 is connected by cog drive belt 40 to a larger pulley 41 keyed to a shaft 42. Shaft 37 is adjustable in a known manner radially in any direction on flange 22, for adjusting the tension of belts 35 and 40.

Shaft 42 is journaled for rotation in anti-friction bearings in a bracket 43 secured to frame 1, for adjustment vertically in FIG. 3, for belt tensioning, but is approximately aligned axially with pivot pin 7. Another pulley 44 keyed to shaft 42 is connected by cog belt 45 to a pulley 46 secured to shaft 9. As shown in FIG. 3 the axes of the two pulleys 34 and of pulley 36 are spaced approximately equally. Only slight changes in the sum of their center-to-center distances occur when the spindle housings 25, 26, are adjusted about rod 24 to accommodate pinions P of different face widths and cone angles. Hence a single belt 35 will accommodate any pinion design within the range of the machine.

Figure 1:
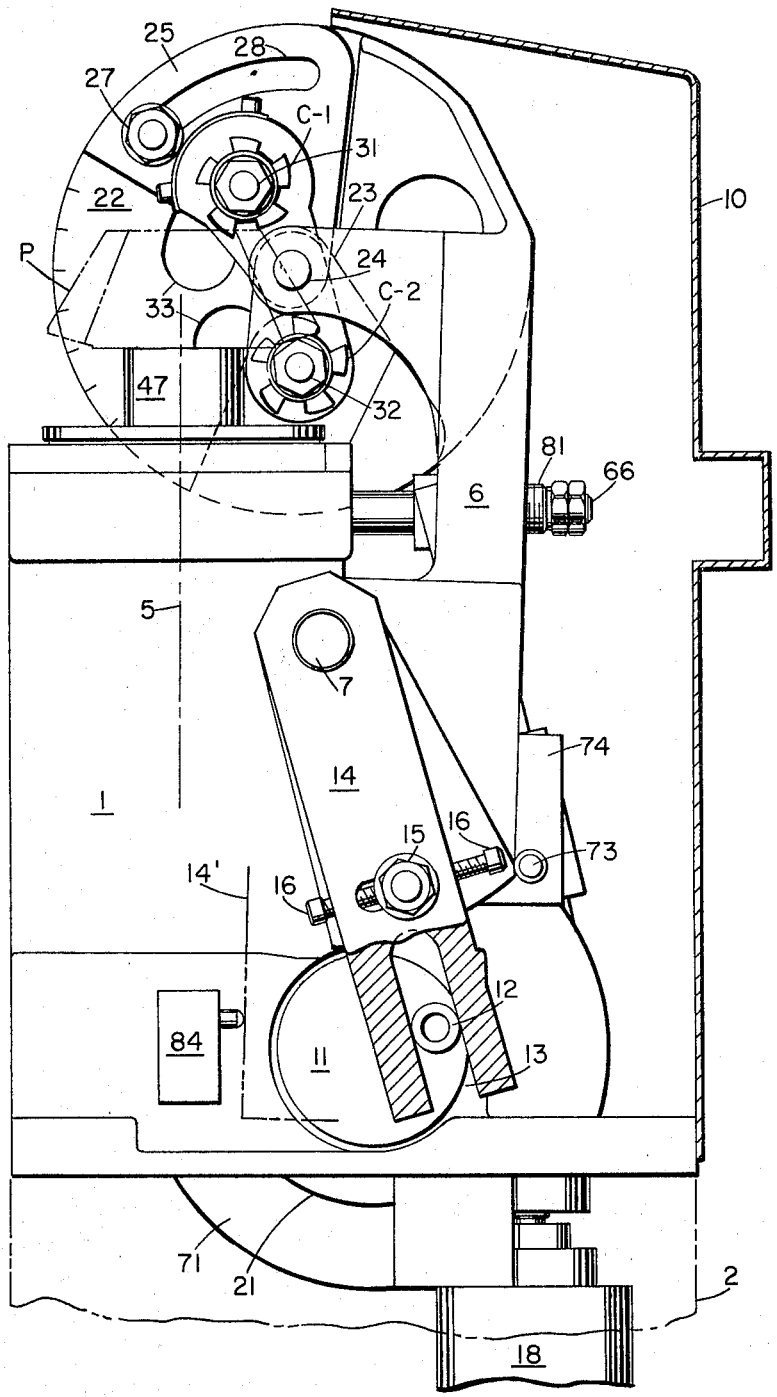
FIGS. 1 and 2 are respectively a side view and an end view of the machine.

In setting up the machine, cutters C–1 and C–2 of appropriate profile curvatures are mounted on the spindles 31, 32, and are adjusted axially therealong to the position of best match with edges p–1 and p–2 of a chamfered sample or master pinion. Coarse adjustment of the cutters C–1 and C–2 along their respective spindles is effected by means of spacers 49, and fine adjustment by means of nuts 51 and 52 screw-threaded to the spindles 31, 32. At the same time, and with the cutter support 6 swung by crank 11, 12, into full depth cutting position, the spindle housings 25 and 26 are adjusted angularly about rod 24 to provide the spacing of the cutters C–1, C–2, that is required by the face width of the pinion. As shown in FIG. 1, graduations are provided on the flange 22 to facilitate such adjustment. Concomitantly with this angular adjustment, the pinion may itself be adjusted along axis 5 by a suitable threaded collar or spacer. A work spindle nose piece 47 may then be provided which is of proper length to support the pinion in the finally determined position along this axis, the nose piece being secured to the work spindle 3 by screws 48, FIGS. 2 and 6, and having a lower portion 50 fitting within the bore of the spindle. By reason of the several cutter adjustments that are provided, a relatively small number of cutters C–1 and C–2 having different side cutting profiles suffices for a wide range of pinion designs.

The indexing mechanism, FIGS. 2 and 6, comprises an index plate 53 detachably secured to the work spindle 3 by screws 54. The periphery of the plate has equally spaced arcuate notches 55 corresponding in number to the teeth in the pinion P. These notches are successively engageable by an index pawl 56 which has an interfitting arcuate tip and is pivoted by pin 57 to a carrier plate 58 that is rotatable on a ball-sleeve bearing 59 on the work spindle, about axis 5. A spring 61 acting between the plate 58 and the pawl urges the latter counterclockwise about pin 57 toward a limit position in which the pawl abuts a pin 62 on the plate 58. An abutment 63 secured to the frame 1 is contacted by the side of the pawl opposite to that engageable with pin 62, to limit motion of the plate 58 in the indexing direction, counterclockwise in FIG. 6. In this condition the line 64 between the center of pin 57 and the center of the arcuate tip of the pawl is offset from axis 5, so that counterclockwise torque on the plate presses the pawl into the notch of the index plate, holding the work spindle against angular displacement. Upon clockwise or reset rotation of the plate 58, the pawl turns on pin 57 to disengage from the notch and rides on the periphery of the index plate 53 until it drops into the next notch. During such reset motion the index plate is held against rotation by a spring-backed pin 65 which is slidable in the frame 1 and is engageable in the same notch as the pawl (at the conclusion of each counterclockwise motion of plate 58).

The pawl carrier plate 58 has gear teeth 66 meshing with a rack 67 that is reciprocable in the frame, to rotate the plate back and forth. Such reciprocation is effected by a lever 68, FIGS. 2 to 6, which is pivoted at its upper end to the rack and at its lower end has a follower pin 69 engaged in a continuous cam groove 70 in one face of a cam disc 71 affixed to shaft 9. On opposite sides of the lever there are grooves 72 receiving a pair of axially aligned pins 73 which constitute the fulcrum of the lever. They are carried by a block 74 which is adjustable vertically on the frame, along T-slot 75, FIG. 5, to change the position of the fulcrum along the lever and thereby change the stroke of rack 67. In this way the mechanism is adjustable for index plates having different numbers of notches 55. Adjustment of block 74 is effected manually, by turning a screw 76 that is rotatable in the frame and is screw-threaded to block 74. After such adjustment the block is secured to the frame by means of a nut and T-bolt 77 anchored in slot 75.

This adjustment also necessitates adjustment of the lever 68 relative to rack 67 so that at the end of each indexing stroke the pawl 56 will be clamped against the abutment 63. For this purpose pivot pins 78, FIGS. 4 and 6, in the upper end of lever 68 are carried by a block 79 that is screw-threaded to a sleeve 81, the sleeve being secured to the rack by a nut 82. Upon loosening of this nut the sleeve may be rotated to adjust the block 79 and pivot pins 78 longitudinally of the rack.

The crank 11, 12 and cam 70, 71 are in such phase relation that the final or cutting part of the infeed stroke of the cutter support, counterclockwise in FIGS. 1 and 4, and the initial portion of the withdraw stroke are effected at the conclusion of the indexing stroke of rack 67 (to the left in FIG. 1, downwardly in FIG. 6) and that a dwell in cam 70, 71 holds the pawl 56 clamped against abutment 63 to solidly hold the index plate and work spindle against rotation during the infeed stroke of the cutter support. Following this dwell the return and indexing strokes of the rack occur during the withdraw stroke of the cutter support and the initial part of its next infeed stroke.

The operation of the machine, once started by means of a starting switch (not shown) in the control system of motor 18, is continuous until all the teeth of the workpiece have been chamfered. At that time a limit switch 83, FIG. 2, and limit switch 84, FIG. 1, arranged in series in the motor control system, are both closed, causing the motor to brake to a stop. Switch 83 is closed by a button 85 on the work spindle, signifying that the workpiece has been indexed through 360°, and switch 84 is closed by arm 14 reaching its clockwise limit position (14' in FIG. 1), signifying that the cutters are fully withdrawn from the work.

By reason of the arrangement of the machine and the several adjustments provided in it, a wide range of pinion designs within the size range of the machine are readily accommodated. Usually the only parts that need be changed for a different pinion design, are the two milling cutters C–1 and C–2, and their spacers 49, the nose piece 47 of the work spindle, the contractible chuck collet (not shown) which clamps the shank S of the workpiece in the work spindle 3, and the index plate 53.

Having now described the preferred embodiment of my invention and its operation, what I claim is:

1. A chamfering machine comprising a frame, a work spindle journaled for rotation in the frame, indexing mechanism for angularly advancing the work spindle about its rotation axis, a cutter support pivoted to the frame for oscillation about an axis transverse of the work spindle, a multi-bladed milling cutter rotatable on the support about an axis parallel to said axis of oscillation, means for rotating the cutter, and coordinated drive means for actuating the indexing mechanism and for oscillating the cutter support to swing the cutter axis about said axis of oscillation and thereby infeed and withdraw the cutter relative to a workpiece on the spindle, said drive means being coordinated to cause indexing of the spindle while the cutter is withdrawn.

2. A machine according to claim 1 in which said drive means includes a drive shaft parallel to said axis of oscillation, and said means for rotating the cutter comprises a belt and pulley drive including a pulley co-rotatable with said drive shaft, another pulley rotatable on the frame about an axis substantially coincident with said axis of oscillation, and still another pulley co-rotatable with the cutter.

3. A machine according to claim 1 in which the cutter is rotatable in a housing on the cutter support, and the housing is adjustable on the support about an adjustment axis parallel to the cutter axis.

4. A machine for chamfering gears or the like comprising a frame, a work spindle journaled for rotation in the frame, a cutter support pivoted to the frame for oscillation about an axis transverse of the work spindle, a housing adjustable on the support about an adjustment axis parallel to the axis of oscillation, and a milling cutter rotatable in the housing about an axis parallel to said adjustment axis and to said axis of oscillation.

5. A machine according to claim 4 in which there are means for adjusting the cutter relative to the housing along the axis of rotation of the cutter.

6. A machine for chamfering the opposite ends of a gear or the like, comprising a frame, a work spindle journaled for rotation in the frame, a cutter support pivoted to the frame for oscillation about an axis transverse of the work spindle, a pair of housings independently adjustable on the support about an adjustment axis parallel to the axis of oscillation, and a pair of milling cutters of which one is rotatable in each of said housings, with the rotation axes of both cutters parallel to said adjustment axis and to said axis of oscillation.

7. A machine according to claim 6 in which each of the cutters is adjustable, independently of the other cutter, relative to its supporting housing along its axis of rotation.

8. A machine according to claim 7 in which the drive means for rotating the cutters comprise a pulley corotatable with each cutter, a pulley rotatable on the cutter support about a rotation axis spaced from said adjustment axis of the housings, said rotation axis being so spaced, at approximately equal distances from the two cutter axes in the mean positions of adjustment of the housings on the cutter support, that the sum of the three center distances of said pulleys is approximately constant throughout the adjustment range of said housings, and an endless belt around said pulleys.

9. A chamfering machine comprising a frame, a work spindle journaled for rotation in the frame, indexing mechanism for angularly advancing the work spindle about its rotation axis, a cutter support pivoted to the frame for oscillation about an axis transverse of the work spindle, a milling cutter rotatable on the support about an axis parallel to said axis of oscillation, means for rotating the cutter, and coordinated drive means for actuating the indexing mechanism and for oscillating the cutter support to swing the cutter axis about said axis of oscillation and thereby infeed and withdraw the cutter relative to a workpiece on the spindle, said drive means being coordinated to cause indexing of the spindle while the cutter is withdrawn, and said indexing mechanism comprising a rotatable notched index plate on the work spindle, a pawl for engaging the notches of said index plate and a carrier for the pawl oscillatable about the work spindle rotation axis, a lever for oscillating said carrier, and a cam for oscillating said lever, the lever having an adjustable fulcrum to the frame whereby the angle of oscillation of the carrier may be adjusted.

10. A machine for chamfering gears or the like comprising a frame, a work spindle journaled for rotation in the frame, indexing mechanism for angularly advancing the work spindle about its rotation axis, a cutter having a support pivoted to the frame for oscillation about an axis transverse of the work spindle, and coordinated drive means for actuating the indexing mechanism and for oscillating the cutter support to thereby infeed and withdraw the cutter relative to a workpiece on the spindle, said drive means being coordinated to cause indexing of the spindle while the cutter is withdrawn, and said indexing mechanism comprising a rotatable notched index plate on the work spindle, a pawl for engaging the notches of said index plate and a carrier for the pawl oscillatable about the work spindle rotation axis, a lever for oscillating said carrier, and a cam for oscillating said lever, the lever having an adjustable fulcrum to the frame whereby the angle of oscillation of the carrier may be adjusted.

11. A machine according to claim 10 in which said lever is pivoted to a rack which is reciprocable in the frame and is operably connected to said carrier for oscillating the same.

12. A machine according to claim 11 in which the fulcrum of the lever to the frame comprises a pin adjustable on the frame in a direction substantially lengthwise of the lever, and the lever having an elongated slot receiving said pin.

13. A machine according to claim 11 in which the pivot of the lever to the rack is adjustable relative to the rack in the direction of reciprocation of the rack.

14. A machine according to claim 10 in which said pawl is pivoted to the carrier, there is an abutment on the carrier engageable with one side of the pawl to limit pivotal motion thereof in the direction in which it engages a notch of the index plate, and there is another abutment engageable with the opposite side of the pawl to pivot the pawl in said direction to press it firmly into such notch at the conclusion of each indexing stroke of the carrier.

References Cited by the Examiner
UNITED STATES PATENTS

| | | | |
|---|---|---|---|
| 2,758,512 | 8/1956 | Christman | 90—1.4 |
| 2,953,068 | 9/1960 | Carlsen | 90—6 |

WILLIAM W. DYER, Jr., *Primary Examiner.*

G. A. DOST, *Assistant Examiner.*